United States Patent Office 3,444,752
Patented May 20, 1969

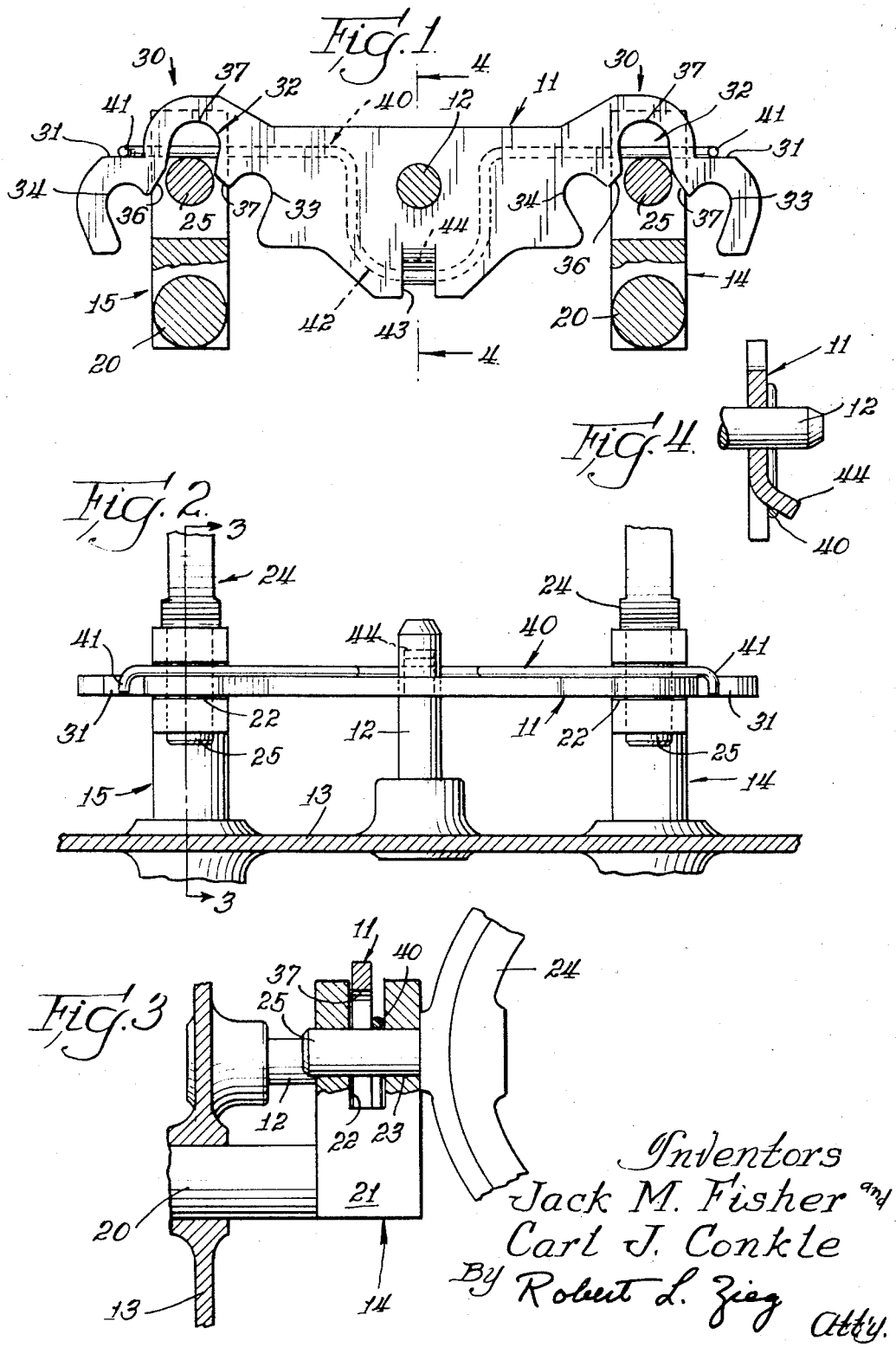

1

3,444,752
TRANSMISSION SHIFT CONTROL MECHANISM
Jack M. Fisher and Carl J. Conkle, Muncie, Ind., assignors to Borg-Warner Corporation, Chicago, Ill., a corporation of Illinois
Filed Mar. 30, 1967, Ser. No. 627,132
Int. Cl. G05g 5/10
U.S. Cl. 74—477                                   7 Claims

ABSTRACT OF THE DISCLOSURE

A combined interlock and detent mechanism for a pair of transmission shift controls. The interlock and detent mechanism comprises a single flat plate type lever having recesses and cam surfaces on either end thereof. Each end includes a recess for the neutral position of the shift control and a recess for the ratio positions of the shift control such that when one of the shift controls is moved to a ratio position the cam mechanism is operated to pivot the lever and engage the other shift control within the neutral recess to an extent that said other shift control is positively held in the neutral positions.

Summary of invention

An improved linkage mechanism for use in a transmission comprising a single lever having a plurality of recesses on either end thereof engageable with a pair of shift control elements so that said single lever operates to hold either of the elements in its neutral position when one of the elements is moved to a ratio establishing position whereby both a locking and a detent function is provided by the single lever.

Description of the drawings

FIGURE 1 is a view of the control mechanism of the present invention;

FIGURE 2 is a top view of the mechanism of FIGURE 1 partially in section;

FIGURE 3 is a partial sectional view taken along the lines 3—3 of FIGURE 2; and

FIGURE 4 is a sectional view taken along the line 4—4 of FIGURE 1.

Detailed description

Referring to FIGURE 1, the improved control mechanism of the present invention includes a flat plate type lever 11 mounted on a pin 12. The pin 12 is mounted in a transmission cover plate 13 as illustrated in FIGURE 2. Also mounted within the transmission cover plate are a pair of shift control elements 14 and 15. The cover plate 13 thus serves as a support member for lever 11 and shift control elements 14 and 15.

The shift control elements 14 and 15 are identical in construction and comprise a shaft 20 passing through the transmission cover 13 which is connectible through suitable linkage to a manual transmission control on the steering wheel or floor of a vehicle. Integral with the shaft 20 is a bell crank 21 including a slot 22 formed therein. The bell crank 21 also has a bore 23 therein for attachment of a transmission shift fork 24.

The shift fork 24 has a pin 25 formed thereon which is rotatably mounted in a bore 23 in bell crank 21. It will be apparent that when a particular ratio is to be selected, the manual control on the steering wheel is operated to rotate the shaft 20 of shift control 14 or shift control 15 to rotate the bell crank 21 to move the shift fork connected to that particular bell crank, so as to engage a particular transmission ratio in a manner well known in the prior art.

2

The flat plate type lever 11 preferably has identical end portions 30 thereon including a shoulder 31 formed thereon. The shape of end portions 30 however may differ when required for a particular transmission installation. A neutral recess 32 and ratio recesses 33 and 34 are formed in the lower edge of lever 11 as viewed in FIGURE 1. A cam surface 35 is provided between the neutral recess 32 and ratio recess 33 and a cam surface 36 is provided between neutral recess 32 and ratio recess 34. Neutral recess 32 includes a locking portion 37 therein so that recess 32 extends further into the lever 11 than the ratio recesses. The pin 25 formed on the shift fork 24 will be in the position illustrated in FIGURE 1 when the shift control 14 and 15 are in their neutral positions.

Also provided on the lever 11 is a spring or resilient member 40, preferably of one-piece construction, which has bent end portions 41 thereon, and a generally U-shaped portion 42 in the center thereof. A slot 43 is provided in the lever 11 by partially punching out a section of metal on lever 11, so as to provide a projection 44 thereon as illustrated in FIGURE 4. The spring 40 is mounted under projection 44. The spring 40 is held in place by a combination of the U-shaped portion 42 being placed under the projection 44 and the engagement of the ends 41 with the shoulders 31 formed on lever 11. The spring is slightly deflected when assembled to lever 11 so that it remains in position.

Each of the shift control members 14 and 15 have a neutral position and, for example, in a three speed transmission would each have a position to the left end and to the right of neutral corresponding to different ratio establishing positions. It is important within manual transmission mechanisms that when one ratio is to be established by movement of one of the shift controls 14 or 15, the other shift control be held in its neutral position to prevent damage to the transmission. In the present invention if, for example, shift control 14 would be moved to one of its ratio positions, for example so that pin 25 would be in engagement with recess 33, as pin 25 travels it engages cam surface 35 which rocks or pivots the lever 11 to move the left end thereof, as viewed in FIGURE 1 counterclockwise which will engage the pin 25 on control 15 into portion 37 of neutral recess 32. Shift control 15 is thus locked in position and cannot be moved until the left end of lever 11 is moved clockwise.

A proper detent feel or resistance is provided during movement of shift control 14 due to the fact that the spring 40 engages pin 25 on shift control 15 and yieldably resists the rocking movement of the lever 11. The radial position of each of the ratio recesses is such that, for example, with the pin 25 on shift control 14 in engagement with recess 33, the left end of the lever 11 has been moved far enough counterclockwise to engage locking portion 37 so that the shift control member 15 cannot be moved toward either of its ratio positions.

It will be apparent from the above description that the present invention provides a single lever mechanism including a spring mounted thereon which functions to provide both the detent and also the necessary positive interlock in a manually shifted transmission. This construction is considerably simplified and more economical than such mechanisms heretofore known. Two lever interlock mechanisms are known in the prior art, as well as other types which require separate detent and separate interlock structures. Due to the construction of the lever 11 and spring 40, they may be assembled outside of the transmission and the placement of the detent and interlock mechanism into the mechanism is simplified in that it can be assembled to the pin 12 as a unit very readily. Due to the simplification of the structure provided by the present invention, it is believed that the cost of providing the combined interlock and detent function will be reduced and the reliability of the mechanism increased.

Various of the features of the invention have been particularly shown and described; however, it should be obvious to one skilled in the art that various modifications may be made therein without departing from the scope of the invention.

We claim:

1. In a linkage mechanism, a support, a pair of shift control members each mounted on said support and being movable from a neutral position to a ratio position, a lever pivoted on said support having at each end thereof a neutral recess and at least one ratio recess, a cam surface on either end of said lever between said neutral and ratio recesses, said shift control members each having means engaging said neutral recess when in said neutral position, said cam surface being engaged by said means when one of said shift control members is moved toward its ratio position whereby said lever will pivot and said means on said other shift control member will be moved further into said neutral recess to positively lock said other shift control member in said neutral position.

2. A mechanism as claimed in claim 1, including bias means mounted on said lever and in engagement with each of said means whereby a yieldable resistance to movement of said shift control members from said neutral position is provided.

3. In a linkage mechanism, a support, a pair of shift control members each mounted on said support and being movable from a neutral position to a ratio position, a lever pivoted on said support having at each end thereof a neutral recess and at least one ratio recess, a cam surface on either end of said lever between said neutral and ratio recesses, said shift control members each having means engaging said neutral recess when in said neutral position, said neutral recesses each including a locking position, said cam surface being engaged by said means when one of said shift control members is moved towards its ratio position whereby said lever will pivot and said means on said other shift control member will engage said locking position on the respective neutral recess to positively lock said other shift control member in said neutral position.

4. A mechanism as claimed in claim 3, including bias means mounted on said lever and in engagement with each of said means whereby a yieldable resistance to movement of said shift control members from said neutral position is provided.

5. A mechanism as claimed in claim 3 wherein said means comprises a pin mounted on each of said shift control members, said recesses having a complementary shape to said pin for engagement with same.

6. In a linkage mounted on a support, a pair of shiftable elements each movable along a path relative to the support to a plurality of shift positions, interlock means comprising a lever pivoted on said support, the lever having a portion movable relative to each element, cam surfaces on said lever engageable with each of said elements, a first pair of recesses on said lever engaged by said shiftable elements and releasably holding each of said shiftable elements in a first opsition, said shiftable elements having at least one position other than the first, a second pair of recesses on said lever adapted to be engaged by and releasably hold said shiftable elements when said shiftable elements are in said position, and said first pair of recesses including means to positively lock either element in said first position when the other element is in said other position.

7. A linkage as claimed in claim 6 wherein bias means are provided on said lever engaging said shiftable elements providing a yieldable resistance to movement of said shiftable elements.

References Cited

UNITED STATES PATENTS

| | | | |
|---|---|---|---|
| 2,009,536 | 7/1935 | Warg | 74—483 |
| 2,080,964 | 5/1937 | Forstrom | 74—483 XR |
| 2,709,452 | 5/1955 | Calabrese | 74—477 XR |
| 2,366,645 | 1/1945 | Russey | 74—477 |
| 3,264,894 | 8/1966 | Popovich et al. | 74—477 |

HALL C. COE, *Primary Examiner.*

U.S. Cl. X.R.

74—483